Jan. 18, 1949. O. FARLEY 2,459,634
CORN PLANTER SHOVEL ATTACHMENT
Filed Nov. 23, 1945
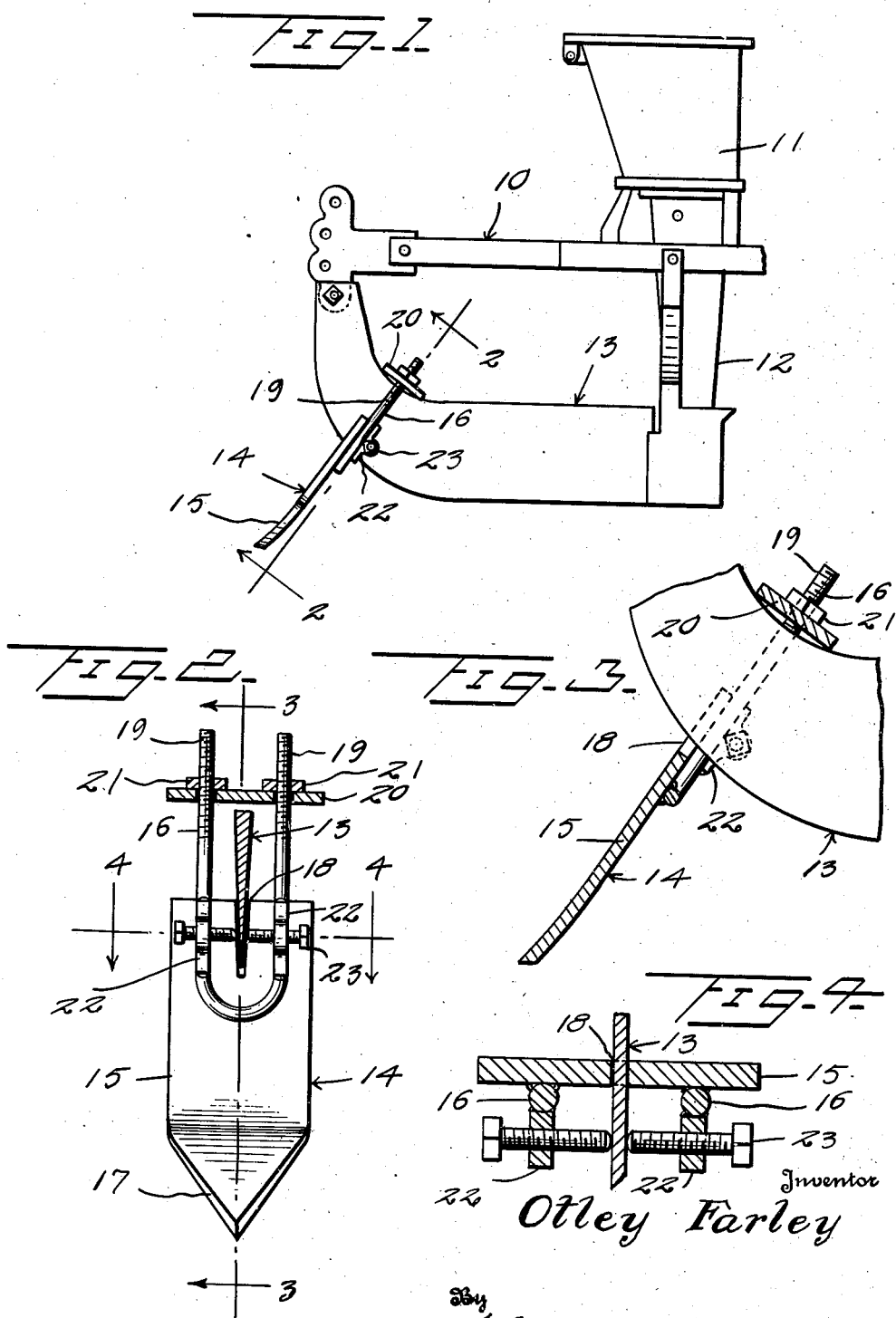
Inventor
Otley Farley
By Kimmel & Crowell Attorneys Patented Jan. 18, 1949

2,459,634

UNITED STATES PATENT OFFICE 2,459,634

CORN PLANTER SHOVEL ATTACHMENT

Otley Farley, Murray, Ky.

Application November 23, 1945, Serial No. 630,222

1 Claim. (Cl. 97—225)

This invention relates to a shovel attachment for a corn planter.

An object of this invention is to provide a shovel which may be attached to the front of a corn planter.

Another object of this invention is to provide a shovel, attached to the sword of a corn planter, which may be adjusted along the length of the sword.

Still another object of this invention is to provide an adjustable shovel for a corn planter and screws to rigidly secure the shovel attachment to the blade of the planter.

A further object of this invention is to provide a shovel attachment for a corn planter whereby a furrow can be made deeper and wider than the sword of the planter, and the shovel breaks the ground and loosens the earth ahead of the sword of the planter.

To the foregoing objects, and others which may may hereinafter more fully appear, the invention consists of the novel construction, combination and arrangement of parts, as will be more specifically referred to and illustrated in the accompanying drawings, but it is to be understood that changes, variations, and modifications may be resorted to which fall within the scope of the invention as claimed.

In the drawings:

Figure 1 is a side view of the front of a corn planter embodying this invention, Figure 2 is a bottom plan view partly in section of the shovel attachment taken on the line 2—2 of Figure 1, Figure 3 is a section taken on line 3—3 of Figure 2, and Figure 4 is a sectional view taken on 4—4 of Figure 2.

Referring to the drawings, the numeral 10 designates generally a corn planter comprising a hopper 11, a feed chute 12, a sword blade 13, and a shovel attachment 14, attached to the front edge of the sword 13.

The shovel attachment 14 comprises a shovel blade 15 and a U-bolt 16 welded or otherwise suitably attached to the blade 15. The shovel blade 15 is formed with a pointed tip 17 and a V-shaped opening 18 in the center of the rear edge of the blade 15. This V-shaped opening 18 extends lengthwise of the blade 15, and is adapted to engage with the front edge of the sword 13.

The U-bolt 16 is fastened to the shovel blade 14 in such a manner that the arms 19 extend rearwardly of the blade 14 and one arm 19 is on each side of the opening 18, and when attached to the sword 13, one arm 19 will be on each side of the sword 13.

A flat plate 20 is formed with two spaced holes to engage the arms 19 of the U-bolt 16. The plate 20 is adapted to attach the shovel 14 to the sword 13 and is held in position by the nuts 21 which are threaded onto the arms 19 of the U-bolt 16.

A pair of fittings 22 are welded onto or otherwise suitably attached to the arms 19 of the U-bolt 16, adjacent the V-shaped opening of the blade 14. The fittings 22 are formed with threaded holes and a set screw 23 is threaded through each fitting 22. The ends of the set screws 23 are adapted to engage the sword 13 when the blade 15 is in position and to steady the blade 15 in place, so that the shovel 14 will not move from its angularly adjusted position on the sword 13.

To fix the shovel 14 in place, the nuts 21 and the plate 20 are removed from the U-bolt 16. The set screws 23 are backed out of the fittings 22 to allow a large clearance around the V-shaped opening 18. The shovel 14 is placed on the sword 13 so that the edge of the sword 13 fits snugly and tightly into the V-shaped opening 18 and the arms 19 of the U-bolt 16 extend upwardly on each side of the sword 13. The shovel 14 is positioned to extend downwardly and forwardly of the blade 13 in a position as shown in Figure 1. The plate 20 is placed over the arms 19 and the nuts 21 are tightened down to secure the shovel 14 in place.

The set screws 23 are tightened to engage the sword 13 to secure the blade 14 in the desired position laterally of the sword 13.

The exact configuration illustrated is regarded as the optimum, but some of the desirable results inherent in this disclosure may be obtained by various slight modifications including some departure from the exact configuration shown, and it is therefore requested that the scope of the invention should be regarded as limited only by the terms of the claim.

What I claim is:

A shovel attachment for a corn planter sword blade comprising a shovel blade, said shovel blade formed with a V-shaped sword blade receiving opening on the upper edge thereof, upwardly extending bolts fixed on said shovel blade on opposite sides of said opening and extending upwardly beyond the upper edge of said shovel blade, threaded fittings on said blade spaced from the opposite sides of said opening and spaced rearwardly from said blade, means engaging said bolts and said sword blade for securing said shovel blade at a selected position along the length of said sword blade, and set screws engaging through said fittings engaging the opposite sides of said sword blade for holding the shovel blade locked in its selected position.

OTLEY FARLEY.

REFERENCES CITED

The following references are of record in the file of this patent:

UNITED STATES PATENTS

| Number | Name | Date |
| --- | --- | --- |
| 220,157 | Lafferty et al. | Sept. 30, 1879 |
| 670,302 | Ware | Mar. 19, 1901 |